(12) United States Patent
Tateyama et al.

(10) Patent No.: US 6,940,700 B2
(45) Date of Patent: Sep. 6, 2005

(54) MAGNETIC HEAD AND MAGNETIC REPRODUCING APPARATUS

(75) Inventors: Kohichi Tateyama, Kanagawa-ken (JP); Susumu Hashimoto, Kanagawa-ken (JP); Masayuki Takagishi, Kanagawa-ken (JP); Tomomi Funayama, Kanagawa-ken (JP); Yuichi Ohsawa, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 292 days.

(21) Appl. No.: 10/176,577

(22) Filed: Jun. 24, 2002

(65) Prior Publication Data
US 2003/0011940 A1 Jan. 16, 2003

(30) Foreign Application Priority Data
Jun. 22, 2001 (JP) ........................................ 2001-190513

(51) Int. Cl.7 ................................................ G11B 5/33
(52) U.S. Cl. ...................................................... 360/321
(58) Field of Search ................................ 360/321, 318, 360/318.1

(56) References Cited

U.S. PATENT DOCUMENTS 6,388,846 B1 * 5/2002 Albertini et al. ......... 360/318.1
2004/0160705 A1 * 8/2004 Hara et al. ................. 360/321

FOREIGN PATENT DOCUMENTS

| EP | 475397 A2 | * | 3/1992 |
| JP | 04121808 A | * | 4/1992 |
| JP | 7-235020 | | 9/1995 |
| JP | 2000285416 A | * | 10/2000 |

* cited by examiner

*Primary Examiner*—Tianjie Chen
(74) *Attorney, Agent, or Firm*—Oblon, Spivak, McClelland, Maier & Neustadt, P.C.

(57) ABSTRACT

In a magnetic head having magnetic yoke layers, each magnetic yoke layer includes a yoke projecting portion (2A) projected toward a recording medium, and yoke setback portions (2B) set back from the yoke projecting portion. A first bias magnetic field applying film (5) of an antiferromagnetic material is formed to cover the yoke projecting portion whereas a second bias magnetic field applying film (6) of a ferromagnetic material may be formed on opposite side surfaces of the yoke projecting portion.

9 Claims, 15 Drawing Sheets

MAGNETIC HEAD AND MAGNETIC REPRODUCING APPARATUS

CROSS-REFERENCE TO RELATED APPLICATIONS

This application is based upon and claims the benefit of priority from the prior Japanese Patent Application No. 2001-190513, filed on Jun. 22, 2001; the entire contents of which are incorporated herein by reference.

BACKGROUND OF THE INVENTION

This invention relates to a magnetic head and a magnetic reproducing apparatus, and more particularly, to a magnetic head including a magnetic yoke having a projected portion toward a recording medium, and a magnetic reproducing apparatus incorporating the magnetic head.

Although HDDs (hard disk drives) have recently experienced epoch-making improvement in magnetic recording density, further enhancement of their recording density is still demanded. Along with the progressive downsizing of recording bits to cope with the continuous demand for higher and higher recording densities, conventional thin-film heads became insufficient in reproduction sensitivity, and surrendered its position as the main current to magnetoresistance effect (MR) heads making use of a magnetoresistance effect. Among these MR heads, spin valve giant magnetoresistance (SVGMR) heads are being remarked as exhibiting an especially large magnetoresistance effect.

On the other hand, along with enhancement of the recording density, floating amounts of thin-film magnetic heads during traveling are decreasing for detecting smaller medium bit magnetic fields. It is therefore predicted that magnetic heads will be inevitably driven in intermittent or continuous contact with recording mediums. Also from various viewpoints other than enhancement of the recording density, HDDs will be brought into use in AV (audio-visual) devices (such as video and/or audio recorders) as the multimedia era matures. When a HDD is borne in an AV device, reliability of HDD, especially its durability against external impact, is an important issue. If an external impact (such as mechanical shock or vibration) is applied, then the magnetic head may unexpectedly hit the medium surface. Therefore, there is a demand for development of magnetic heads resistant to physical contacts.

However, the above-indicated SVGMR heads are well known as exhibiting abnormal changes of resistance due to the heat generated by contact with recording mediums during reproduction (thermal asperity). Therefore, conventional MR heads and SVGMR heads whose magnetic detector portions are exposed on medium-facing surfaces of the magnetic heads may fail to follow the future enhancement of recording density.

In contrast, the use of a yoke-type magnetic head that includes a magnetic yoke for leading the signal magnetic field from the recording medium to an MR element is considered effective. Since the yoke-type magnetic head is so configured that the magnetic detector portion of the MR device is not exposed on the medium-facing surface, it is resistant to thermal asperity.

Taking those situations into consideration, it will be effective toward future enhancement of magnetic recording density to combine a yoke-type magnetic head and an MR element.

However, to ensure a signal magnetic flux from a minute recording bit to be read out with a high resolution, a projecting portion must be made at the tip of the magnetic yoke, that is, on the medium-facing surface. In other words, it is necessary to provide a minute projecting portion on the medium-facing surface of the magnetic yoke so as to draw up there the signal magnetic flux from the recording bit with a high resolution.

However, as a result of the Inventors' own researches, the yoke-type magnetic head having such a projecting portion was found to involve the magnetic domain generated at the projecting portion of the magnetic yoke as another large factor of noise in addition to the MR element.

FIGS. 18A and 18B are schematic diagrams that show the structure of a yoke-type magnetic head prepared and evaluated by the Inventors in the way toward the present invention. FIG. 18A is its perspective view, and FIG. 18B is its longitudinal cross-sectional view.

The magnetic head shown here includes a pair of magnetic yoke layers 2, 2 formed on a substrate 12 to face to a recording medium, not shown, in alignment with each other via a magnetic gap 1. A magnetoresistance effect film 4 underlies the magnetic yoke layers 2, 2, and a lower electrode 7 and an upper electrode 8 are connected to supply a sense current perpendicularly to the film plane.

In this yoke-type magnetic head, the pair of magnetic yoke layers are magnetically coupled to the magnetoresistance effect film 4 to form a magnetic circuit, and detect a signal magnetic flux led from the recording medium to the magnetoresistance effect film.

For the purpose of detecting a signal from a minute recording bit of a recording medium, not shown, while distinguishing it from those of adjacent recording bits, each magnetic yoke layer 2 has a projecting portion 2A of a predetermined size. More specifically, as shown in FIGS. 18A and 18B, the magnetic yoke layer 2 has the yoke projecting portion 2A projecting toward the recording medium and a yoke setback portion 2B formed to set back from the yoke projecting portion 2A. Thus the spatial resolution of magnetic detection of the yoke-type magnetic head can be determined by adjusting the width and projecting amount of the projecting portion 2A.

In case of a CPP (current perpendicular to the plane) magnetoresistance effect element as shown in FIGS. 18A and 18B, the projecting portion 2A may be formed in agreement with an electrode formed on the magnetoresistance effect film 4.

In this type of yoke-type magnetic head, when a magnetic domain is generated in the magnetic yoke layers 2 and irregularly moves in response to a signal magnetic field, it produces noise. Therefore, a bias magnetic field is preferably applied to control the magnetic domain generated in the yokes 2. In case of the magnet head shown in FIGS. 18A and 18B, bias magnetic field applying films 6, 6 of a hard magnetic material are formed on opposite side surfaces of the magnetic yoke layers 2 to control the magnetic domain of the magnetic yoke layers 2.

The Inventors however, have found through their researches that a bias magnetic field from the bias magnetic field applying films 6 on opposite side surfaces of the yoke setback portions 2B may occasionally fail to reach the yoke projections 2A of the magnetic yoke layers 2 sufficiently. If the bias magnetic field is not applied sufficiently, then the magnetic domain irregularly moves in response to the signal magnetic field especially near the medium-facing surface, and noise is liable to occur.

BRIEF SUMMARY OF THE INVENTION

According to an embodiment of the invention, there is provided a magnetic head for detecting a signal magnetic field from a recording medium, comprising: a pair of magnetic yoke layers aligned via a magnetic gap, each said magnetic yoke layer including a yoke projecting portion projected toward said recording medium, and including yoke setback portions set back from said yoke projecting portion; a magnetoresistance effect film magnetically coupled to said magnetic yoke layers; a pair of electrodes coupled to said magnetoresistance effect film to supply a current thereto; and first bias magnetic field applying films made of an antiferromagnetic material provided at said yoke projecting portions.

According to another embodiment of the invention, there is provided a magnetic head for detecting a signal magnetic field from a recording medium, comprising: a pair of magnetic yoke layers aligned via a magnetic gap, each said magnetic yoke layer including a yoke projecting portion projected toward said recording medium, and including yoke setback portions set back from said yoke projecting portion; a magnetoresistance effect film magnetically coupled to said magnetic yoke layers; a pair of electrodes coupled to said magnetoresistance effect film to supply a current thereto; and second bias magnetic field applying films made of an ferromagnetic material and covering at least a part of opposite side surfaces of said yoke projecting portions.

BRIEF DESCRIPTION OF THE DRAWINGS

The present invention will be understood more fully from the detailed description given herebelow and from the accompanying drawings of the embodiments of the invention. However, the drawings are not intended to imply limitation of the invention to a specific embodiment, but are for explanation and understanding only.

In the drawings:

FIGS. 18A and 18B are schematic diagrams that show the structure of a yoke-type magnetic head prepared and evaluated by the Inventors in the way toward the present invention, in which FIG. 18A is a perspective view and FIG. 18B is its longitudinal cross-sectional view.

DETAILED DESCRIPTION OF THE INVENTION

Some embodiments of the invention will now be explained below with reference to the drawings.

Figure 1:
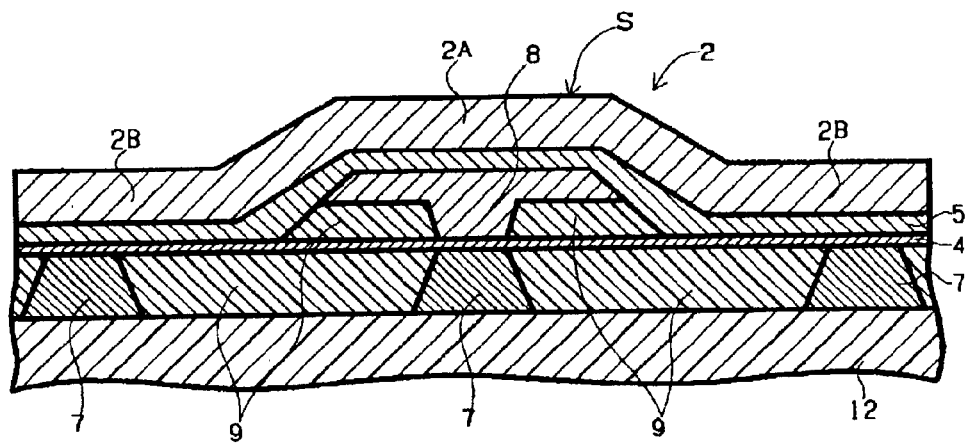
FIG. 1 is a schematic diagram that shows a cross-sectional structure of the substantial part of a magnetic head according to an embodiment of the invention.

FIG. 1 is a schematic diagram that shows a cross-sectional structure of the substantial part of a magnetic head according to an embodiment of the invention. This is a cross-sectional view taken along a plane vertical to a medium-facing surface S facing to a recording medium, not shown, corresponding to FIG. 18B.

Figure 18A:
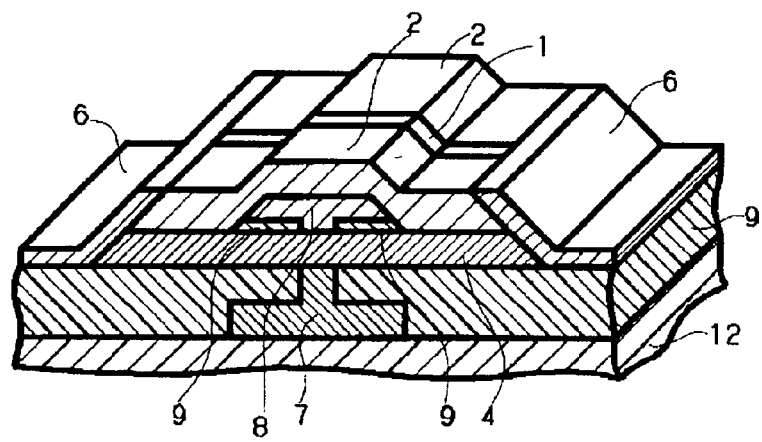
Figure 18B:
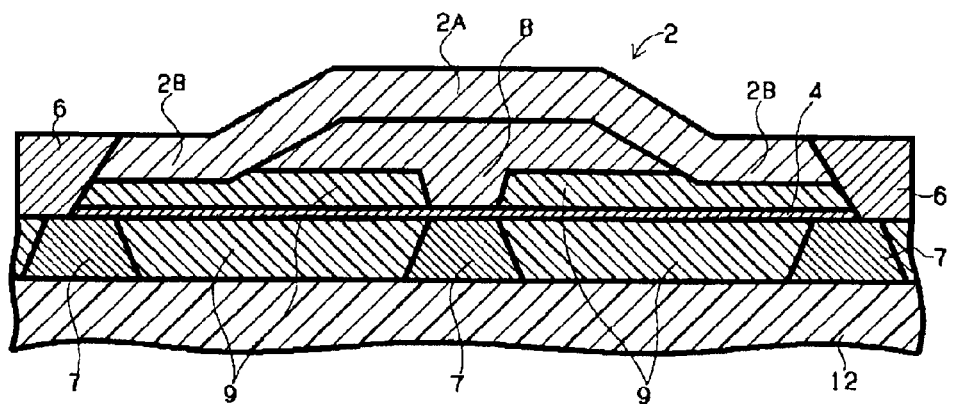

Similarly to the magnetic head shown in FIGS. 18A and 18B, the magnetic head shown in FIG. 1 has a pair of magnetic yoke layers 2, 2 formed to lie on the medium-facing surface S and aligned to each other via a magnetic gap in the direction vertical to the plane of the drawing sheet. FIG. 1 is a cross-sectional view taken by cutting one of the yokes along its lengthwise direction.

On a substrate 12, a magnetoresistance effect film 4 underlies each magnetic yoke layer 2, and a lower electrode 7 and an upper electrode 8 are connected thereto to supply a sense current substantially vertically to the plane of the film 4. That is, the magnetoresistance effect element shown here has a CPP (current perpendicular to the plane) structure.

Explanation is continued about the magnetoresistance effect element. CIP (current in-plane) GMR elements that need regulation of the reproducing track width between electrodes to cope with the recent rapid progress of microminiaturization will soon make microprocessing (for a track width not exceeding 0.2 $\mu$m) thereof very difficult with the current manufacturing process. In this respect, CPP GMR elements configured to supply a sense current perpendicularly to the film plane of the MR film are more advantageous.

Japanese Patent Laid-Open Publication No. H10-55512 is one of publications disclosing a CPP MR element, the entire contents of this reference being incorporated herein by reference. A representative CPP MR element is a tunneling magnetoresistance effect (TMR) element that has recently attained a giant magnetoresistance effect by making use of the tunneling effect of electrons.

Turning back to the embodiment shown in FIG. 1, each magnetic yoke layer 2 includes a yoke projecting portion 2A projected toward a recording medium, and yoke setback portion 2B formed to set back from the yoke projecting portion 2A. In this specific example, the yoke projecting portion 2A is formed by skewing the magnetic yoke layer 2 toward the recording medium. The yoke projecting portion 2A can regulate the detecting resolution of a signal magnetic field from a recording bit. In this specific example, the upper electrode 8 of the magnetoresistance effect film 4 is formed in agreement with the projecting portion 2A.

The gap between the upper electrode 8 and the magnetoresistance effect film 4 is buried with an insulating layer 9. A bias magnetic field applying film 5 made of an antiferromagnetic material is formed to extend to cover the upper electrode 8 and upper surfaces of opposite end portions of the magnetoresistance effect film 4. An insulating film, not shown, may be inserted between the magnetoresistance effect film 4 and the bias applying film 5 to prevent the shunt of the sense current.

An exchanging bias magnetic field applied from the bias applying film 5 to the magnetic yoke layer 2 aligns magnetization in the magnetic yoke layer 2 and prevents generation of magnetic domains therein. Once any magnetic domain is produced in the magnetic yoke layer 2, it will become a noise-generating factor upon movements of the magnetic wall relative to the signal magnetic field during reproduction.

In shield type magnetoresistance effect (MR or GMR) heads not having magnetic yoke layers, noise could be prevented by controlling magnetic domains only in the portion of the magnetoresistance effect element. In yoke-type magnetic heads, however, since a signal magnetic field is guided to the element portion through the magnetic yoke layers, control of magnetic domains in the magnetic yoke layers themselves is a very important issue.

In the yoke-type magnetic head according to the embodiment of the invention, a bias applying film 5 of an antiferromagnetic material is formed on the entire back surface of the magnetic yoke layer 2. As a result, the bias magnetic field can be sufficiently applied to both the yoke projecting portion 2A and the yoke setback portion 2B. That is, since the embodiment of the invention can apply a sufficient bias magnetic field to the entirety of the magnetic yoke layer having the three-dimensional shape including the projecting portion 2A, it can produce low-noise, stable reproduced signals.

Figure 2:
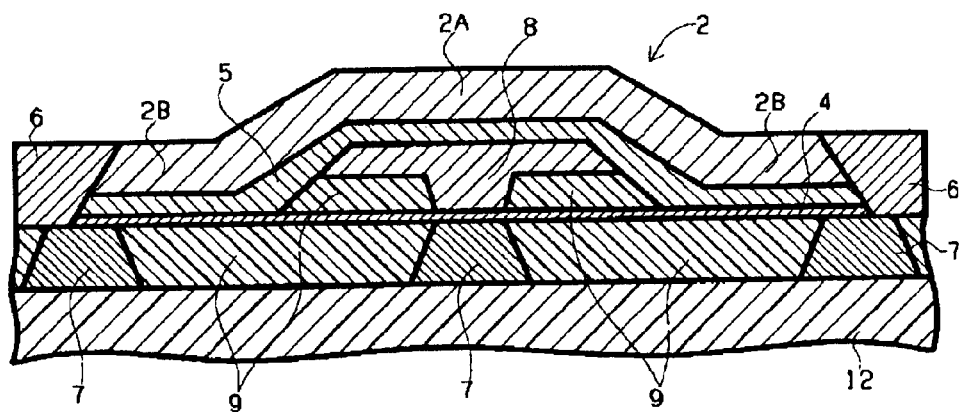
FIG. 2 is a schematic diagram that shows a cross-sectional structure of the substantial part of a magnetic head according to the second specific example of the invention.

FIG. 2 is a schematic diagram that shows a cross-sectional structure of the substantial part of a magnetic head according to the second specific example of the invention. This is also a cross-sectional view taken by cutting one of the magnetic yoke layers 2 along its lengthwise direction. Some of components shown here, which are common to those of FIG. 1, are labeled with common reference numerals, and their detailed explanation is omitted here.

This specific example also includes the bias magnetic field applying film 5 made of an antiferromagnetic material on the back surface of the magnetic yoke layer 2. Additionally, a bias magnetic field applying film 6 of a ferromagnetic material having a high coercive force is formed to lie on opposite side surfaces of the magnetic yoke layer 2 to generate a bias magnetic field for controlling magnetic domains in the magnetic yoke.

The bias magnetic field applying film 5 of an antiferromagnetic material, when getting into exchanging coupling with the magnetic yoke layer 2, can apply a static bias magnetic field even to portions where it is difficult to exert a magnetostatic field bias because of their three-dimensional geometries. In this specific example, by additionally providing the bias magnetic field applying film 6 of a ferromagnetic material having a high coercive force on opposite side surfaces of the magnetic yoke layer 2, it is possible to obtain a bias magnetic field for further stabilization and to cancel influences of a demagnetizing field by magnetic charges generated there, thereby to accomplish a more stable state.

Figure 3:
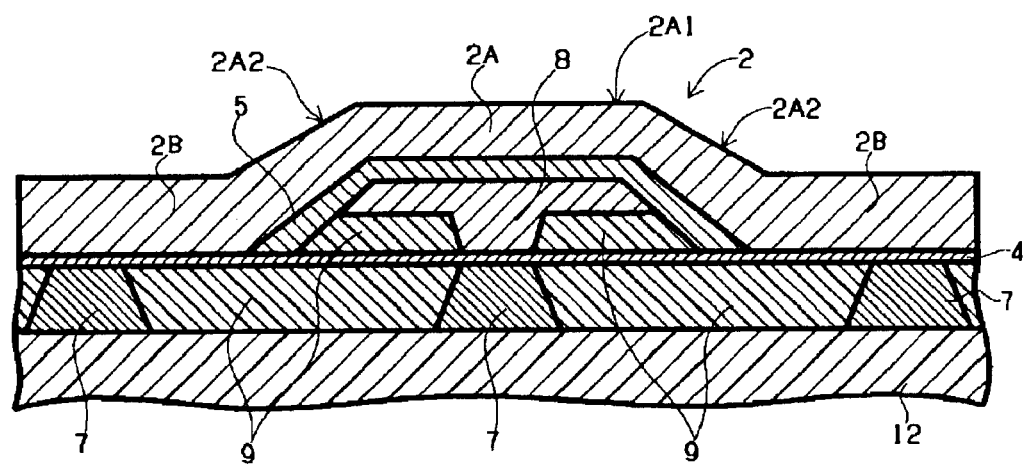
FIG. 3 is a schematic diagram that shows a cross-sectional structure of the substantial part of a magnetic head according to the third specific example of invention.

FIG. 3 is a schematic diagram that shows a cross-sectional structure of the substantial part of a magnetic head according to the third specific example of invention. Here again, some of components shown here, which are common to those of FIGS. 1 and 2, are labeled with common reference numerals, and their detailed explanation is omitted here.

In this specific example, the bias magnetic field applying film 5 of an antiferromagnetic material is locally formed only on the back surface of the magnetic yoke projecting portion 2A projecting toward a recording medium.

In the magnetic yoke layer 2, magnetic domains are most likely to generate in the flat portions 2A1 and the sloping surfaces 2A2 of the magnetic yoke projecting portions, which are nearest to the recording medium. In this specific example, since the bias magnetic field applying film 5 of an antiferromagnetic material is formed on the back surface of those portions and gets into exchanging coupling with the yoke projecting portion 2A, magnetic domains can be stabilized. At the same time, since the bias magnetic field applying film 5 does not exist on back surfaces of the yoke setback portions 2B of the magnetic circuit, which form a path of a signal magnetic flux, magnetic domains can be stabilized without degrading the magnetic efficiency.

Figure 4:
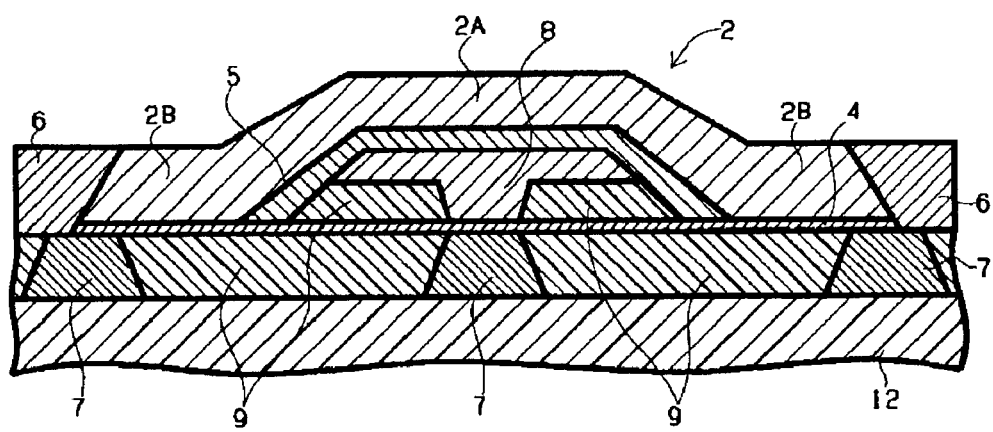
FIG. 4 is a schematic diagram that shows a cross-sectional structure of the substantial part of a magnetic head according to the fourth specific example of the invention.

FIG. 4 is a schematic diagram that shows a cross-sectional structure of the substantial part of a magnetic head according to the fourth specific example of the invention. Here again, some of components shown here, which are common to those of FIGS. 1 to 3, are labeled with common reference numerals, and their detailed explanation is omitted here.

Also in this specific example, the bias magnetic field applying film 5 of an antiferromagnetic material is locally formed exclusively on the back surface of the magnetic yoke projecting portion 2A projecting toward a recording medium. Additionally, a bias magnetic applying film 6 of a ferromagnetic material having a high coercive force is formed to lie on opposite side surfaces of the magnetic yoke layer 2 to generate a bias magnetic field for controlling magnetic domains in the magnetic yoke layer.

The instant specific example can reliably apply the exchanging coupling bias magnetic field to the magnetic yoke projecting portions 2A difficult to apply the bias magnetic field from the bias magnetic field applying films 6 of a ferromagnetic material having a high coercive force, by using the bias magnetic field applying film 5 of an antiferromagnetic material in association with those difficult portions, and can simultaneously prevent generation of magnetic charges in the magnetic yoke setback portions 2B by using the bias magnetic field applying films 6. Moreover, since the bias magnetic field applying film 5 of an antiferromagnetic material does not exist on the magnetic circuit, the specific example can meet the requirement of stabilization without degrading the magnetic efficiency. Therefore, this specific example of the invention realizes a head satisfying both the requirement of stable reproduction signals and the requirement of a high efficiency or a high output.

Figure 5:
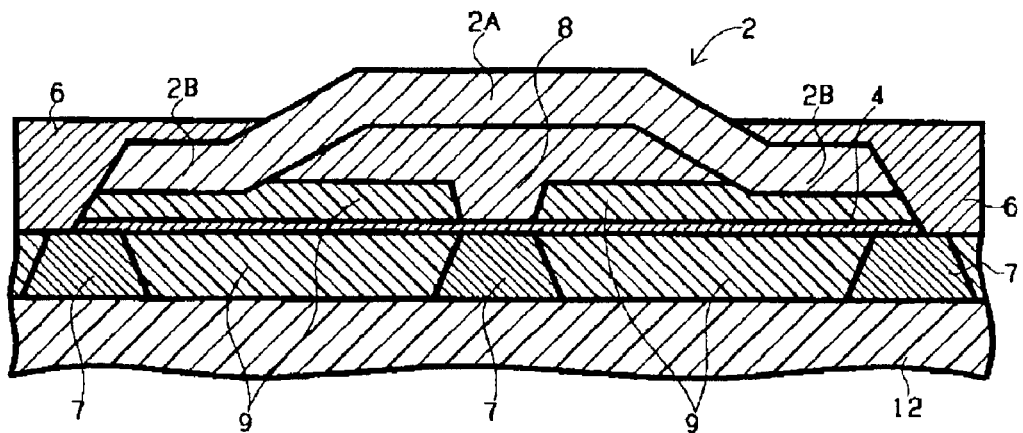
FIG. 5 is a schematic diagram that shows a cross-sectional structure of the substantial part of a magnetic head according to the fifth specific example of the invention.

FIG. 5 is a schematic diagram that shows a cross-sectional structure of the substantial part of a magnetic head according to the fifth specific example of the invention. Here again, some of components shown here, which are common to those of FIGS. 1 to 4, are labeled with common reference numerals, and their detailed explanation is omitted here.

In this specific example, the bias magnetic field applying film 6 of a ferromagnetic material having a high coercive force is formed to cover the opposite side surfaces of the magnetic yoke layer and the top surfaces of the yoke setback portions 2B and to additionally cover lower parts of the sloping surfaces of the yoke projecting portions 2A.

This specific example can sufficiently exert the hard biasing effect also to the yoke projecting portions 2A by extending the bias applying film 6 of a ferromagnetic material closely to the foots of the yoke projecting portion 2A. As a result, the control of magnetic domains by the bias magnetic field is exercised also on the medium-facing surface of the yoke projecting portion 2A.

Figure 6:
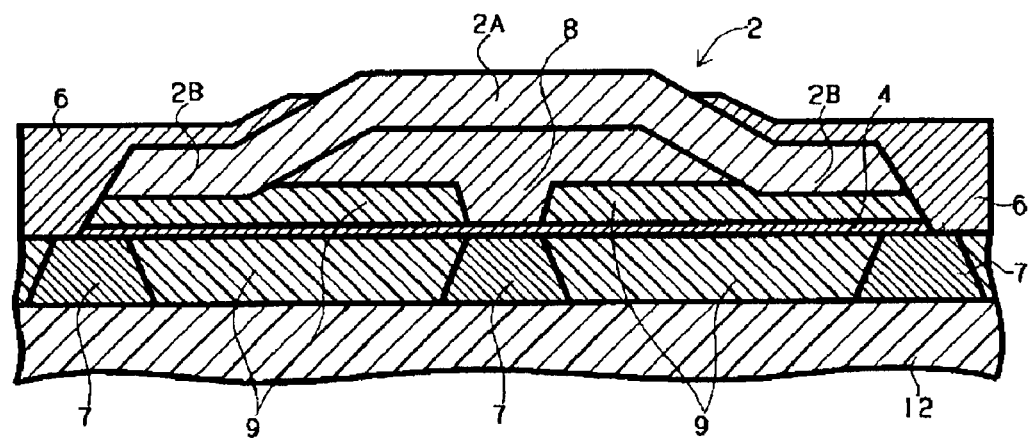
FIG. 6 is a schematic diagram that shows a cross-sectional structure of the substantial part of a magnetic head according to the sixth specific example of the invention.

FIG. 6 is a schematic diagram that shows a cross-sectional structure of the substantial part of a magnetic head according to the sixth specific example of the invention. Here again, some of components shown here, which are common to those of FIGS. 1 to 5, are labeled with common reference numerals, and their detailed explanation is omitted here.

In this specific example, the bias magnetic field applying film 6 of a ferromagnetic material having a high coercive force covers opposite side surfaces of the magnetic yoke layer and upper surfaces of the yoke setback portions 2B, and additionally lies on lower portions of sloping surfaces of the yoke projecting portion 2A.

In this case, the bias magnetic field applying film 6 exerts its hard biasing effect to the yoke projecting portion 2A as well, and enables the control of magnetic domains by the bias magnetic field even on the medium-facing surface of the yoke projecting portion 2A.

It can be determined appropriately whether the bias magnetic field applying film 6 should be formed exclusively on the top surfaces of the yoke setback portions 2B as shown in FIG. 5 or should be formed to extend until partly covering the sloping surfaces of the yoke projecting portions 2A, taking account of parameters such as the projecting amount and width of the yoke projecting portion 2A, thickness and material of the yoke 2, and intensity of the signal magnetic field from the recording medium.

Figure 7:
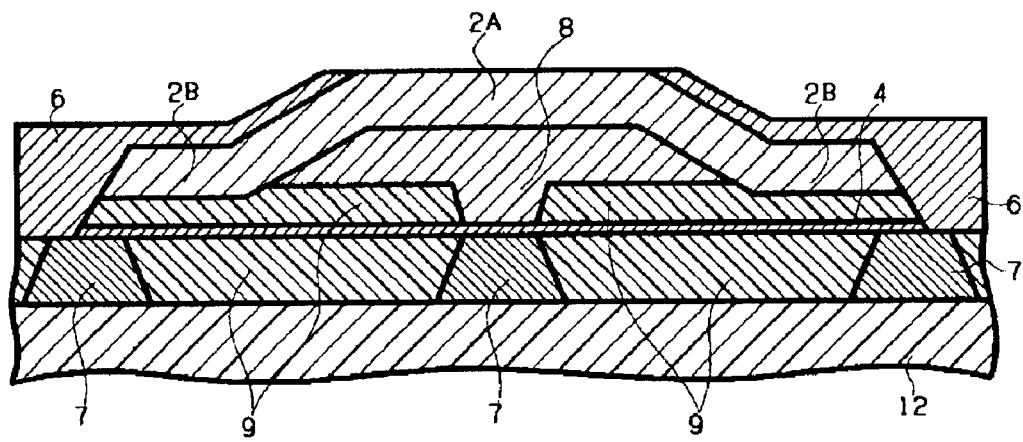
FIG. 7 is a schematic diagram that shows a cross-sectional structure of the substantial part of a magnetic head according to the seventh specific example of the invention.

FIG. 7 is a schematic diagram that shows a cross-sectional structure of the substantial part of a magnetic head according to the seventh specific example of the invention. Here again, some of components shown here, which are common to those of FIGS. 1 to 6, are labeled with common reference numerals, and their detailed explanation is omitted here.

In this specific example, the bias magnetic field applying film 6 of a ferromagnetic material having a high coercive force is extended to cover sloping surfaces of the yoke projecting portions 2A up to substantially the same level as the top surface of the yoke projecting portion 2A.

The bias magnetic field applying film 6 shown here enables more sufficient exertion of the hard biasing effect thereof to the yoke projecting portion 2A, and hence enables more effective control of magnetic domains by the bias magnetic field even on the medium-facing surface of the yoke projecting portion 2A.

It can be adequately determined which of the levels shown in FIGS. 5 through 7 the bias magnetic field applying film 6 should be extended to, taking account of parameters such as the projecting amount and width of the yoke projecting portion 2A, thickness and material of the yoke 2, and intensity of the signal magnetic field from the recording medium. In case the signal magnetic field from the recording medium is not sufficiently intensive, the bias magnetic field applying film 6 is preferably formed to slightly set back from the top surface of the yoke projecting portion 2A for the purpose of preventing turbulence of the signal magnetic field by the magnetic field from the bias magnetic field applying film 6.

Figure 8:
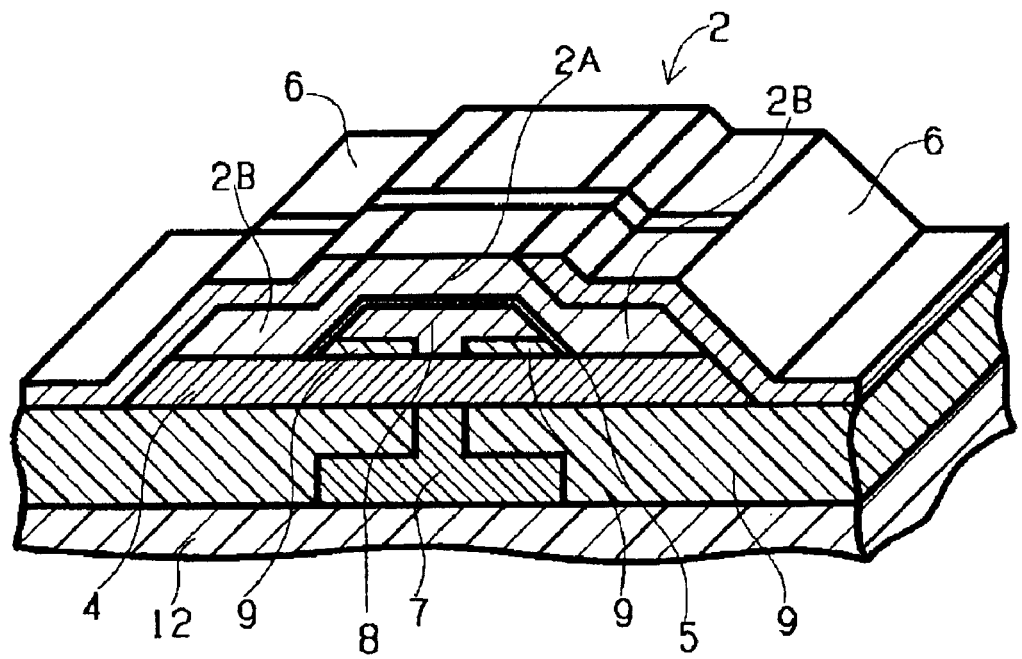
FIG. 8 is a schematic diagram that shows a perspective view of the substantial part of a magnetic head according to the eighth specific example of the invention.

FIG. 8 is a schematic diagram that shows a cross-sectional structure of the substantial part of a magnetic head according to the eighth specific example of the invention. Here again, some of components shown here, which are common to those of FIGS. 1 to 7, are labeled with common reference numerals, and their detailed explanation is omitted here.

In this specific example, the bias magnetic field applying film 6 of a ferromagnetic material having a high coercive force is formed to cover sloping surfaces of the yoke projecting portion 2A up to substantially the same level as the top surface of the yoke projecting portion 2A. Additionally, the bias magnetic field applying film 5 of an antiferromagnetic material is formed on the back surface of the yoke projecting portion 2A.

By combining the bias magnetic field applying film 6 of a ferromagnetic material and the bias magnetic field applying film 5 of an antiferromagnetic material, a sufficient bias magnetic field can be easily applied to the entirety of the projecting portion and the setback portions 2B of the magnetic yoke layer 2.

If the bias magnetic field applying film is formed of a ferromagnetic material having a high coercive force, a bias magnetic field for more reliable stability can be obtained, and simultaneously, influences of a demagnetizing field by magnetic charges generated in that portion can be cancelled. Thus a more stable state can be attained.

Next explained is a magnetic head manufacturing method according to an embodiment of the invention, taking the magnetic head having the structure according to the fourth specific example.

FIGS. 9A through 14C are cross-sectional views of the substantial part of the magnetic head according to the fourth specific example under a manufacturing process.

Figure 9A:
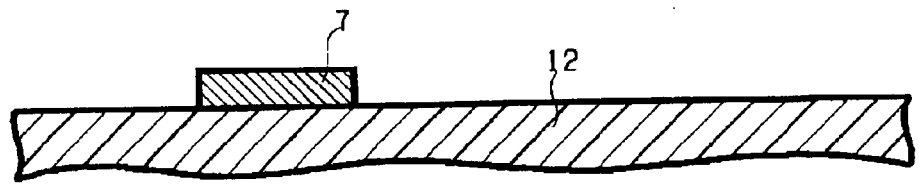
FIGS. 9A through 9D are cross-sectional views of the substantial part of the magnetic head according to the fourth specific example under a manufacturing process.

First as shown in FIG. 9A, the lower electrode 7 is formed on the substrate 12. More specifically, while introducing Ar (argon) gas up to the pressure of 1 mTorr, electrically conductive Cu (copper) is deposited on the substrate 12 already having an insulating film of $SiO_2$ or $Al_2O_3$, for example, by DC magnetron sputtering until a 200 nm thick film is obtained.

As a cohesion layer for the purpose of preventing exfoliation of the electrode from the substrate, a Ta (tantalum) film of a thickness around 5 nm may be formed beforehand. As the material of the electrode, any of electrically conductive metals such as Au (gold), Mo (molybdenum), W (tungsten), Ag (silver) and their alloys (like Au—Cu alloy, Ag—Cu alloy, Au—Ag—Cu alloy, Mo—W alloy, etc) may be used alternatively.

As the material of the cohesion layer, any of metals such as Ti (titanium), Cr (chromium) and their alloys may be used in lieu of Ta.

In the next step, a resist is coated by a thickness around 400 nm, and its pattern defining the width of 500 nm for the electrode is exposed and developed with I rays. Then, etching is carried out in an ion milling apparatus introducing Ar gas up to the pressure of 0.2 mTorr. Then the resist is removed, thereby to obtain the Cu electrode 500 nm wide and 200 nm high.

Figure 9B:
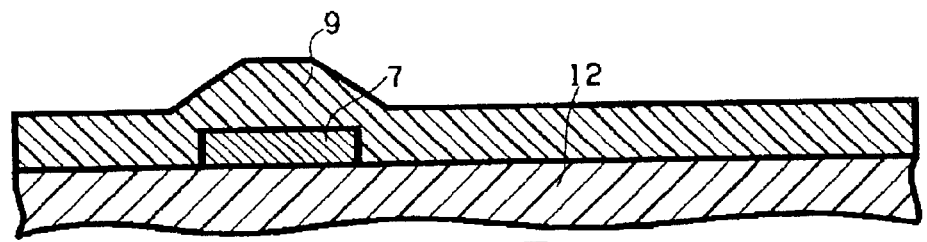

After that, as shown in FIG. 9B, the insulating layer 9 of a thickness around 300 nm is formed. In this specific example, SiO$_2$ can be used as the insulator, and reactive RF sputtering using Si (silicon) as the target and introducing oxygen can be used as the film-forming process. As to the material of the insulator, any material having an insulating property may be used.

Figure 9C:
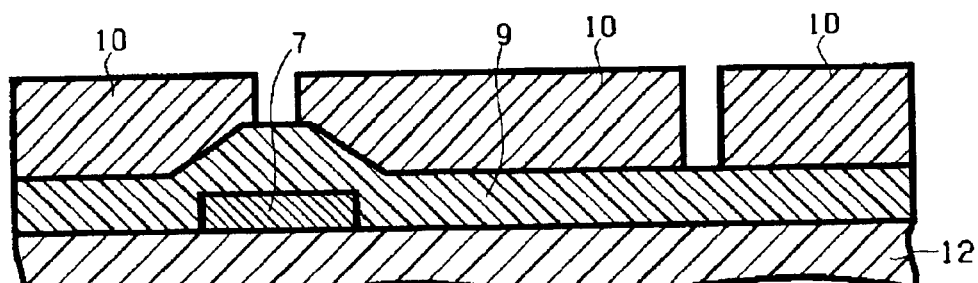

After that, as shown in FIG. 9C, a contact hole for access to the electrode 7 is formed. For example, after a resist for EB (electron beam) is coated up to a thickness around 200 nm, it is patterned by EB exposure to define a 200 nm contact hole in diameter. There is no limitation for the size and shape of this contact hole, and they may be determined appropriately in accordance with the specification of the head to be made.

Figure 9D:
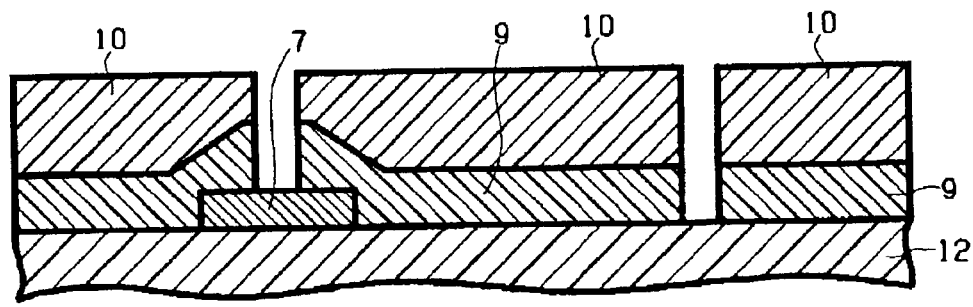

As next shown in FIG. 9D, etching is carried out by RIE (reactive ion etching) to make the contact hole. For the etching, CHF$_3$ may be used as the gas seed, and the degree of vacuum during etching may be 1 Pa, for example. The etching speed of SiO$_2$ used here is approximately 60 nm/minute. However, as the process for the etching carried out in this step, ICP or RIBE, for example, may be used in lieu of RIE, provided the selectivity of the etching speed between the patterned resist and insulator is sufficiently large.

Figure 10A:
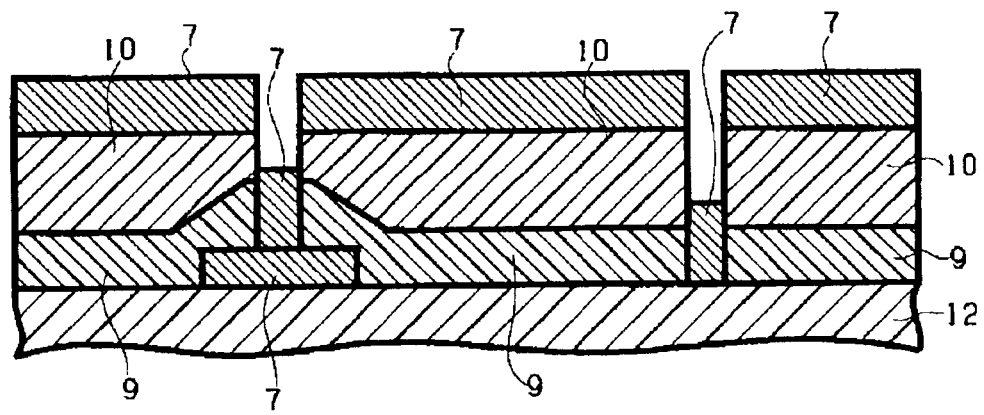
FIGS. 10A through 10C are cross-sectional views of the substantial part of the magnetic head according to the fourth specific example under the manufacturing process.

As next shown in FIG. 10A, the electrode 7 is buried in the contact hole made in FIG. 9D, and the patterned resist and an overlying electrode film are removed by lift-off technique used in a typical semiconductor process. More specifically, this structure can be made by using 400 nm thick Cu as the electrode to buried in the contact hole and using DC sputtering while introducing Ar until making a degree of vacuum around 1 mTorr during deposition and applying a bias.

Figure 10B:
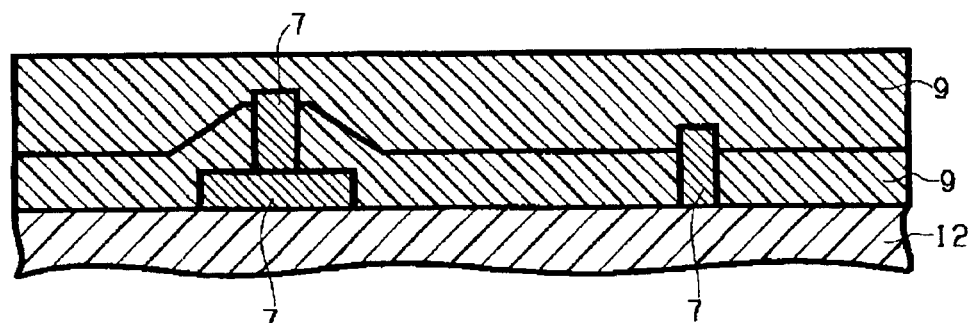

As next shown in FIG. 10B, after the insulating layer 9, 300 nm thick, is formed, a low-viscosity resist (for example, a product from Tokyo Ohka Corporation under the trade name "OFR") is coated, and a thickness around 100 nm of the insulating film 9 is etched off by etch-back technique used in a typical semiconductor process. Thereafter, the structure is smoothed by CMP (chemical mechanical polishing), there by obtain a flat surface as shown in FIG. 10C.

The electrode obtained in this process is 100 nm high and 100 nm in diameter. A sample of this structure was actually prepared and its surface quality was measured by AFM (atomic force micrography). As a result, its surface roughness was within 10 nm, and the electrode was confirmed to be very excellent in flatness and smoothness.

Figure 10C:
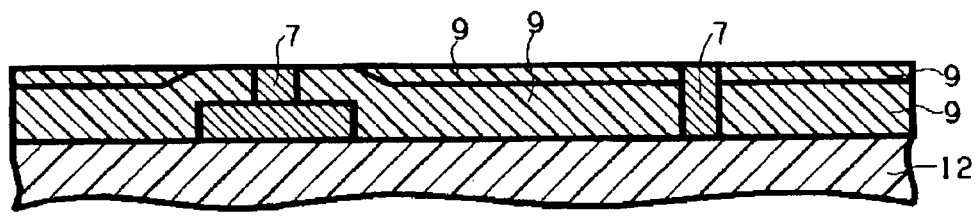
Figure 11A:
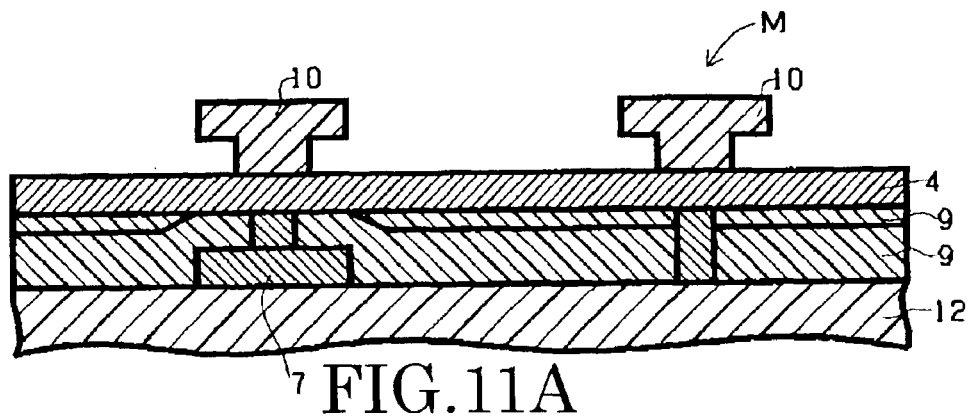
FIGS. 11A through 11D are cross-sectional views of the substantial part of the magnetic head according to the fourth specific example under the manufacturing process.

As next shown in FIG. 11A, a CPP GMR film 4 is formed on the substrate already obtained as shown in FIG. 10C. Then a resist pattern 10 having a T-shaped section is formed. In this case, a T-shaped pattern is simultaneously formed for later use also at he position of an alignment marker M.

Figure 11B:
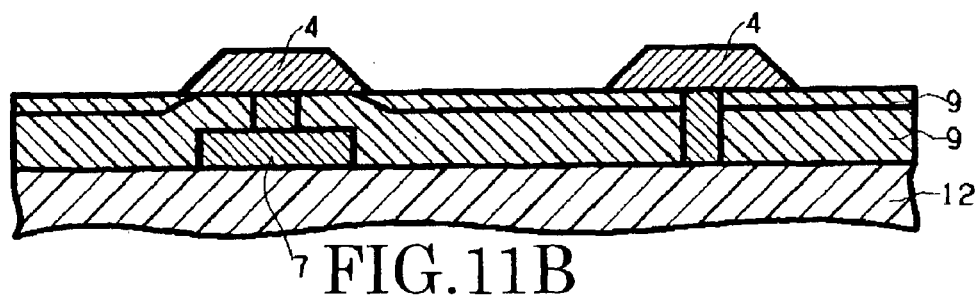

As next shown in FIG. 11B, the CPP GMR film 4 is etched by ion milling to define the shape of the reproducing element. This shape may be approximately 500 nm×500 nm square, for example.

Figure 11C:
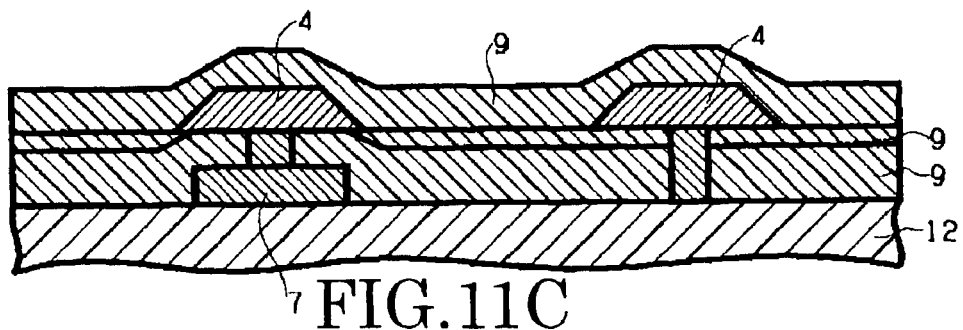

As next shown in FIG. 11C, the insulating film 9, approximately 150 nm thick, is formed on the entire surface.

Figure 11D:
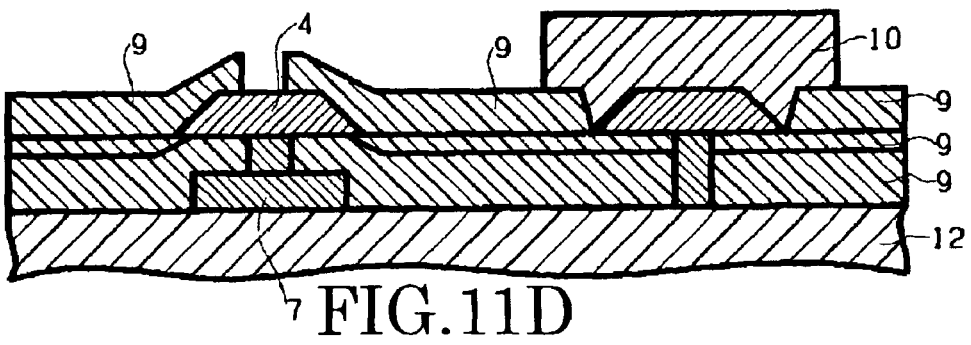

Then as shown in FIG. 11D, using the alignment marker M as the reference, patterning of a contact hole for connection of the upper electrode is carried out by EB lithography, and etching such as RIE for example is carried out, thereby to make out the electrode hole for contact with the CPP GMR film 4.

Figure 12A:
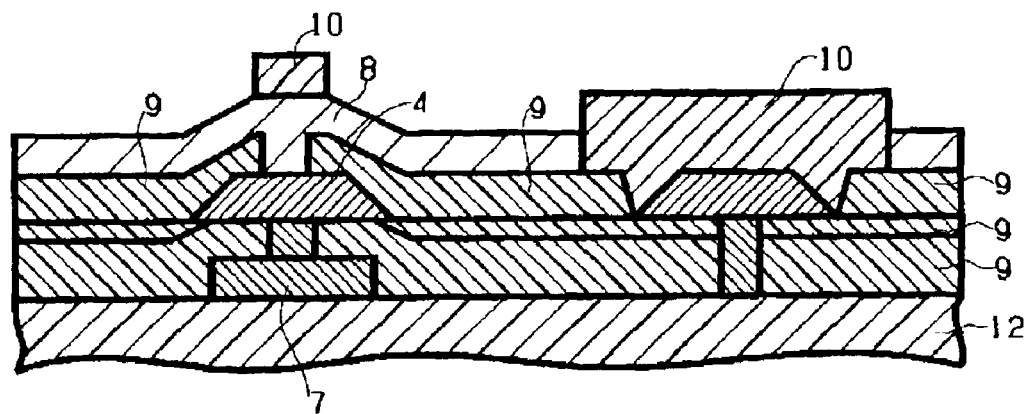
FIGS. 12A through 12C are cross-sectional views of the substantial part of the magnetic head according to the fourth specific example under the manufacturing process.

As next shown in FIG. 12A, after the Cu upper electrode, approximately 200 nm thick, is formed, a mask 10 having a pattern width around 200 nm is formed.

Figure 12B:
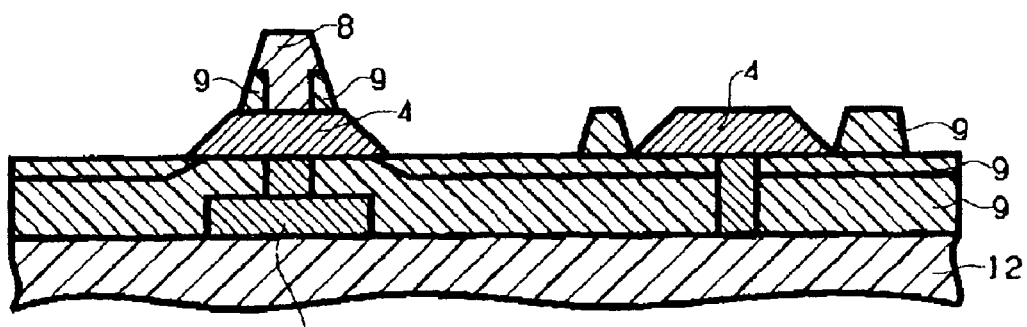

Then the upper electrode 8 is etched by ion milling using the mask 10. When the mask 10 is removed thereafter, the cross-sectional configuration as shown in FIG. 12B is obtained.

A sample of the CPP GMR film 4 and the upper and lower electrodes 8, 7 was actually prepared by the same process, and confirmed to have upper and lower alignment accuracy not larger than 20 nm, that is, to have remarkably excellent accuracy, by cross-sectional TEM (transmission electron microscopy).

Figure 12C:
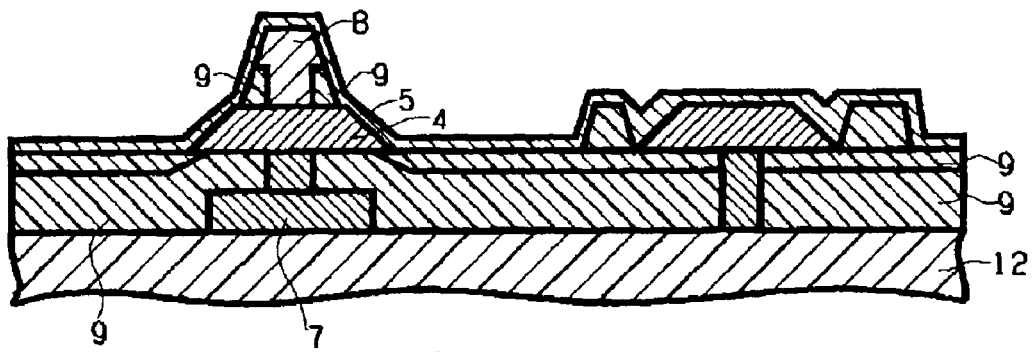

After that, as shown in FIG. 12C, the bias magnetic field applying film 5 of an antiferromagnetic material, which is the core of the embodiment of the invention, is formed on the entire surface. The antiferromagnetic material of the bias magnetic filed applying film 5 may be, for example, approximately 10 nm thick NiO. As the antiferromagnetic material, oxides like NiO and CrO, and alloys of Mn and precious metals, such as IrMn, PtMn, PdMn, (Pt, Pd)Mn, FeMn, etc., are usable. Thickness and shape of the film can be adequately determined as well.

Figure 13A:
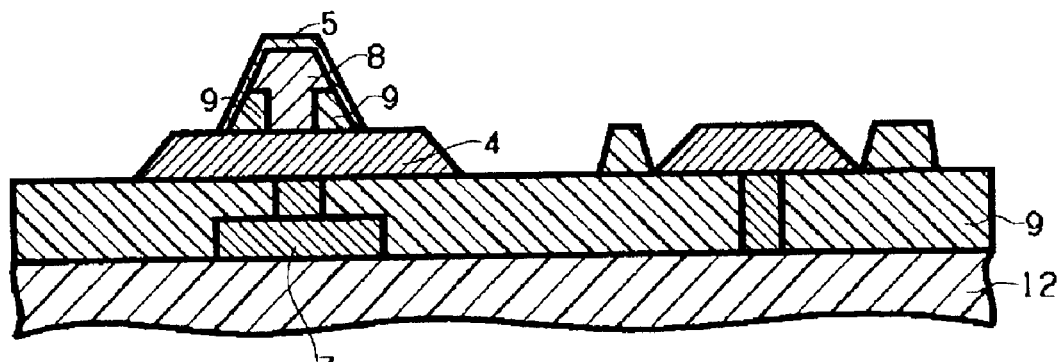
FIGS. 13A through 13D are cross-sectional views of the substantial part of the magnetic head according to the fourth specific example under the manufacturing process.

Subsequently, a resist pattern is formed on a region above the upper electrode 8, and the bias magnetic field applying film 5 is partly removed by etching, thereby to obtain the cross-sectional configuration shown in FIG. 13A.

Figure 13B:
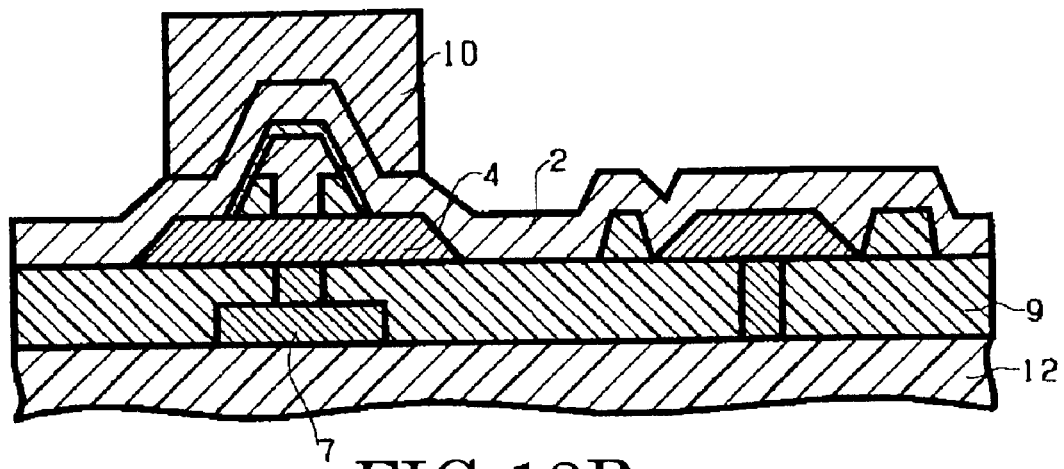

As next shown in FIG. 13B, Ni$_{80}$Fe$_{20}$ (in atomic %) is deposited on the entire substrate surface up to a thickness around 200 nm as the magnetic yoke film, and a resist mask 10 patterned into an approximately 500 nm×500 nm square (substantially the same size as the CPP GMR film 4) is formed.

Figure 13C:
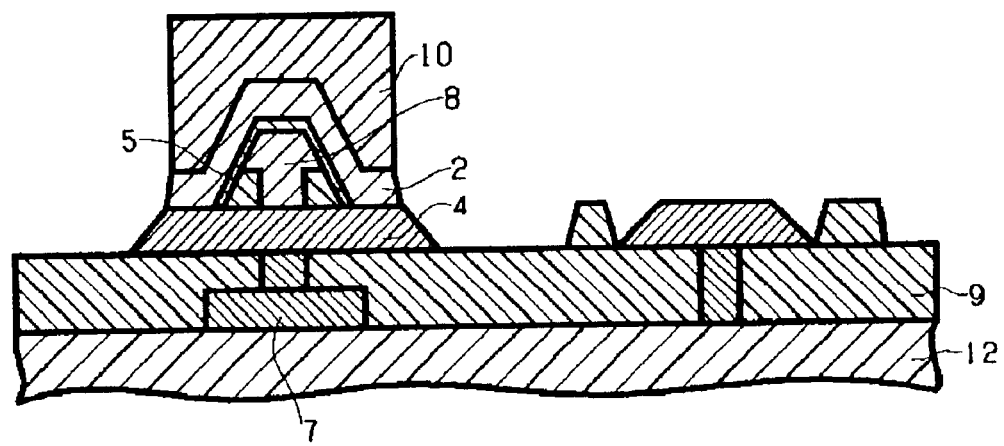

As next shown in FIG. 13C, the substrate having formed the mask 10 undergoes etching by ion milling, for example, to define the yoke film pattern.

Figure 13D:
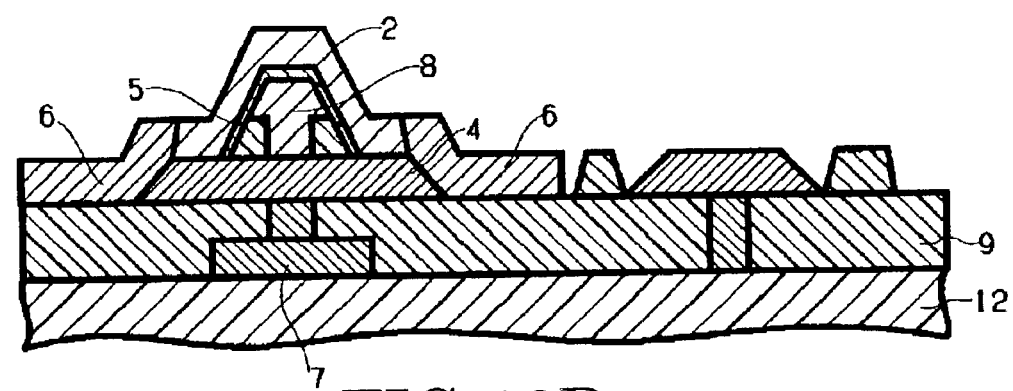

Then as shown in FIG. 13D, after approximately 50 nm thick CoPt is deposited as the bias magnetic field applying film 6, the resist mask 10 is removed by lift-off technique. Material and thickness of the bias magnetic field applying film 6 formed here can be adequately determined in accordance with the specification of the magnetic head to be made.

After that, although not shown, there follow some steps of forming the protective film, processing the gap, polishing the medium-facing surface, and so on. In a magnetic head actually prepared through those steps, magnetic domains along the medium-facing surface of the magnetic head were evaluated while applying an external magnetic field (corresponding to the magnetic field of a medium). As a result, turbulence of magnetic domains in the yoke projecting portions 2A was very small along the medium-facing surface, and the embodiment of the invention was confirmed to be effective for stabilizing magnetic domains in the magnetic yoke layers 2.

Next explained is a manufacturing process of the substantial part of the magnetic head according to the seventh specific example explained above.

Figure 14A:
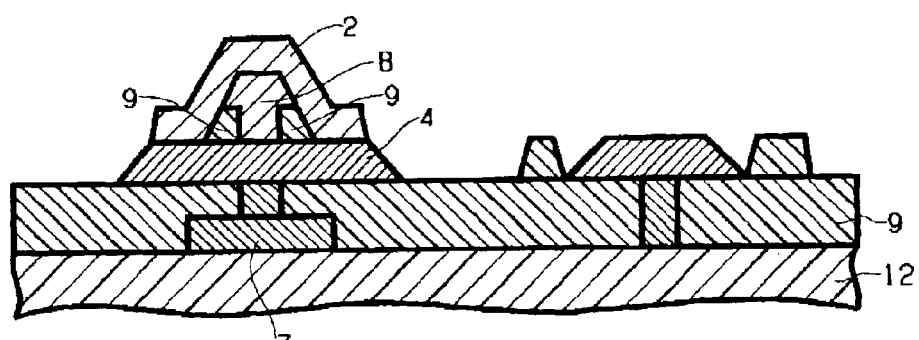
FIGS. 14A through 14C are cross-sectional views of the substantial part of the magnetic head according to the seventh specific example under the manufacturing process.
Figure 14B:
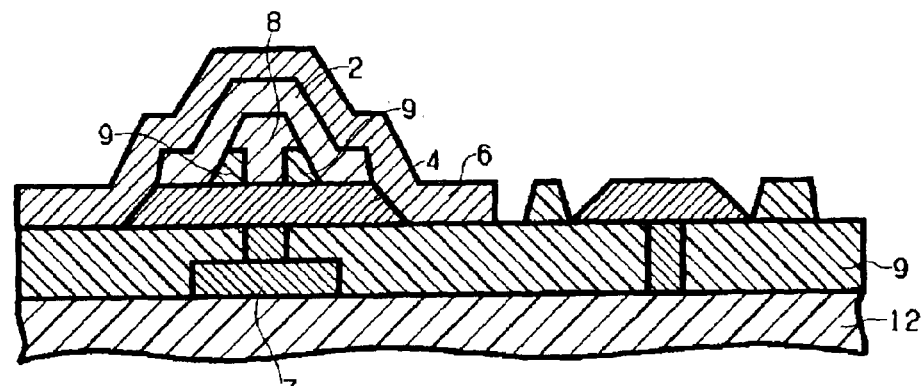
Figure 14C:
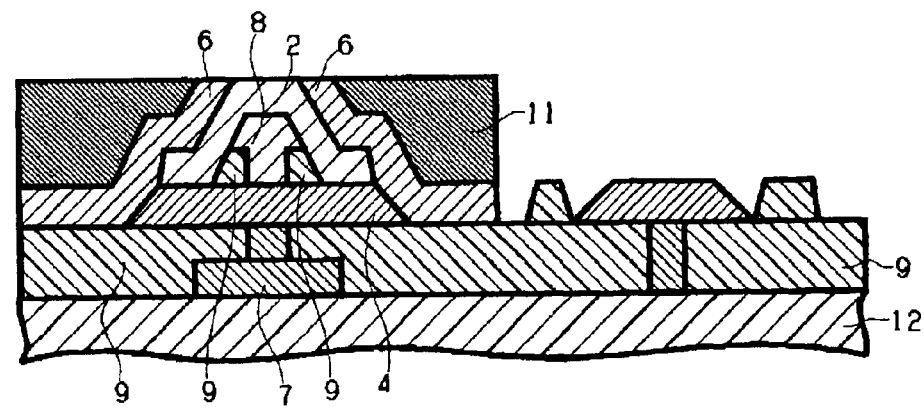

FIGS. 14A through 14C are cross-sectional views of the substantial part of the magnetic head according to the seventh specific example under the manufacturing process.

The aspect shown in FIG. 14A corresponds to the aspect just after removal of the resist mask 10 from the semi product shown in FIG. 13C except that the bias magnetic field applying film 5 is not formed.

From this aspect, as next shown in FIG. 14B, the bias magnetic field applying film 6 of a ferromagnetic material is formed, patterned, and processed for making the gap.

After that, $Al_2O_3$ is once deposited as the protective film 11 on the entire substrate surface, pattered, and next polished by CMP for adjusting the medium-facing surface. As a result, as shown in FIG. 14C, the magnetic head whose yoke projecting portions 2A and the top surface of the bias magnetic field applying film 6 are exposed on the top surface of the protective film can be obtained.

A sample magnetic head was actually prepared by the same process, and a magnetic field was applied to observe magnetic domains along the medium-facing surface. As a result, turbulence of magnetic domains on the distal end of the magnetic pole was very small, and the magnetic head was confirmed to significantly reduce magnetic wall noise caused by turbulence of magnetic domains.

Heretofore, some embodiments of the invention have been explained with reference to FIGS. 1 through 14C. The invention, however, is not limited to the embodiments or specific examples.

Figure 15:
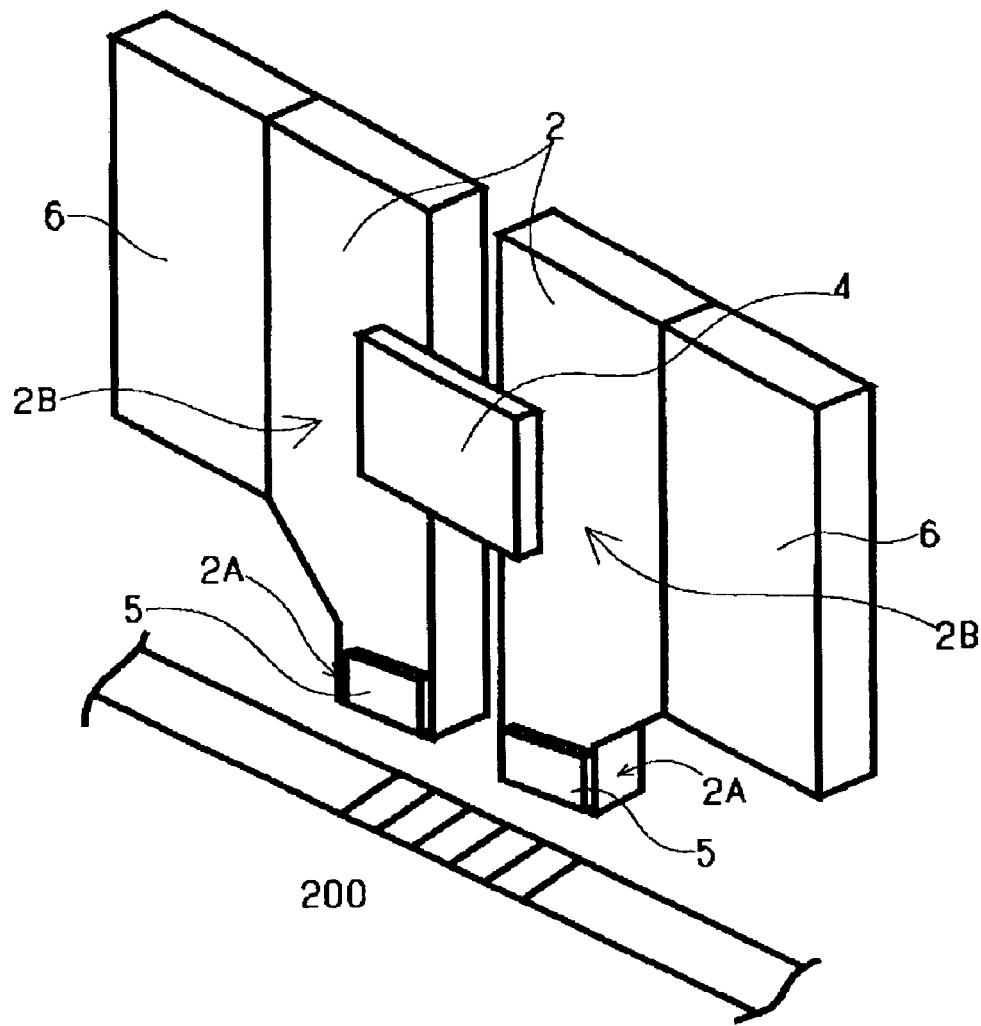
FIG. 15 is a schematic diagram that shows a magnetic head according to a further specific example of the invention.

FIG. 15 is a schematic diagram that shows a magnetic head according to a further specific example of the invention. In the magnetic head shown here, a pair of magnetic yoke layers 2 are aligned side-by-side on a substrate, not shown, located deeper of the plane of the drawing sheet. On these magnetic yoke layers 2, 2, a magnetoresistance effect film 4 is formed to bridge them. The magnetoresistance effect film 4 may be either of the CIP type or of the CPP type.

Each magnetic yoke layer 2 includes a projecting portion 2A forming the distal end thereof and projected toward a recording medium 200, and yoke setback portions 2B formed in opposite sides of the projecting portion 2A to set back therefrom.

The bias magnetic field applying film 6 of a ferromagnetic material is formed to lie next to opposite side surfaces of the yoke setback portions 2B. The bias magnetic field applying film of an antiferromagnetic material is formed to overlie the surfaces of the yoke projecting portions 2A.

In this configuration, the yoke projecting portions 2A projected toward the recording medium 200 are controlled in magnetic domain by an exchanging coupling magnetic field by the bias magnetic applying film 5, whereas the yoke setback portions 2B are controlled by a hard bias from the bias magnetic field applying film 6 on their opposite side surfaces.

That is, this configuration can apply a stable bias magnetic field to the entirety of the magnetic yoke layers 2 having the projecting portions, and can effectively prevent noise caused by generation of magnetic domains in the magnetic yoke layers.

Furthermore, by making the bias magnetic field applying film 6 with a ferromagnetic material having a high coercive force, a bias magnetic field for more reliable stability can be obtained, and simultaneously, influences of a demagnetizing field by magnetic charges generated in that portion 2B can be cancelled. Thus a more stable state can be attained.

Heretofore, some forms of magnetic head according to embodiments of the invention have been explained. As described above, embodiments of the invention make it easy to sufficiently control magnetic domains even in the projecting portions at the distal ends of the magnetic yoke layers in magnetic heads using the magnetic yoke layers, and can significantly reduce magnetic wall noise caused by movements of magnetic walls in the magnetic yoke layers. As a result, embodiments of the invention can provide magnetic heads excellent in process controllability and having high efficiency, high outputs and stable outputs.

This results in a great industrial advantage for realizing magnetic heads having high resolution, high outputs and high S/N ratios, as well as magnetic reproducing apparatuses incorporating them.

Next explained is a magnetic reproduing apparatus having inboard any of the magnetic heads explained with reference to FIGS. 1 through 15.

Figure 16:
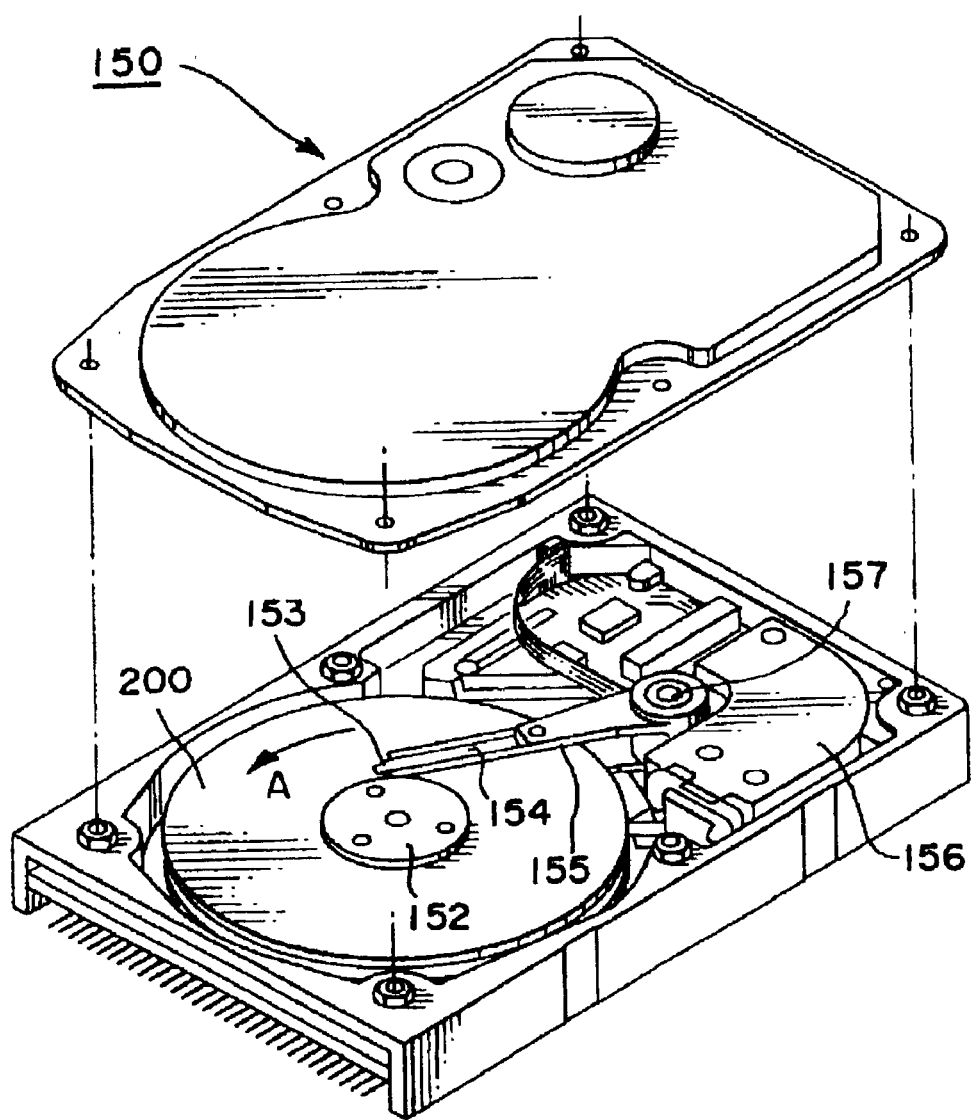
FIG. 16 is a perspective view of the substantial part of a magnetic reproducing apparatus according to an embodiment of the invention, which roughly illustrates its configuration.

FIG. 16 is a perspective view that shows outline configuration of this kind of magnetic reproducing apparatus. The magnetic reproducing apparatus 150 shown here is of a type using a rotary actuator. A magnetic recording medium disk 200 is mounted on a spindle 152 and rotated in the arrow A direction by a motor, not shown, which is responsive to a control signal from a controller of a driving mechanism, not shown. The magnetic reproducing apparatus 150 shown here may have a plurality of medium disks 200 inboard.

The medium disk 200 may be of a "lateral recording type" in which directions of the recording bits are substantially in parallel to the disk surface or may be of a "perpendicular recording type" in which directions of the recording bits are substantially perpendicular to the disk surface.

A head slider 153 for carrying out recording and reproduction of information to be stored in the medium disk 200 is attached to the tip of a film-shaped suspension 154. The head slider 153 supports a magnetic head, for example, according to one of the foregoing embodiments of the invention, near the distal end thereof.

Once the medium disk 200 rotates, the medium-facing surface (ABS) of the head slider 153 is held floating by a predetermined distance above the surface of the medium disk 200. Also acceptable is a so-called "contact-traveling type" in which the slider contacts the medium disk 200.

The suspension 154 is connected to one end of an actuator arm 155 having a bobbin portion for holding a drive coil, not shown, and others. At the opposite end of the actuator arm 155, a voice coil motor 156, a kind of linear motor, is provided. The voice coil motor 156 comprises a drive coil, not shown, wound on the bobbin portion of the actuator arm 155, and a magnetic circuit made up of a permanent magnet and an opposed yoke that are opposed to sandwich the drive coil.

The actuator arm 155 is supported by ball bearings, not shown, which are located at upper and lower two positions of the spindle 157 and driven by the voice coil motor 156 for rotating, sliding movements.

Figure 17:
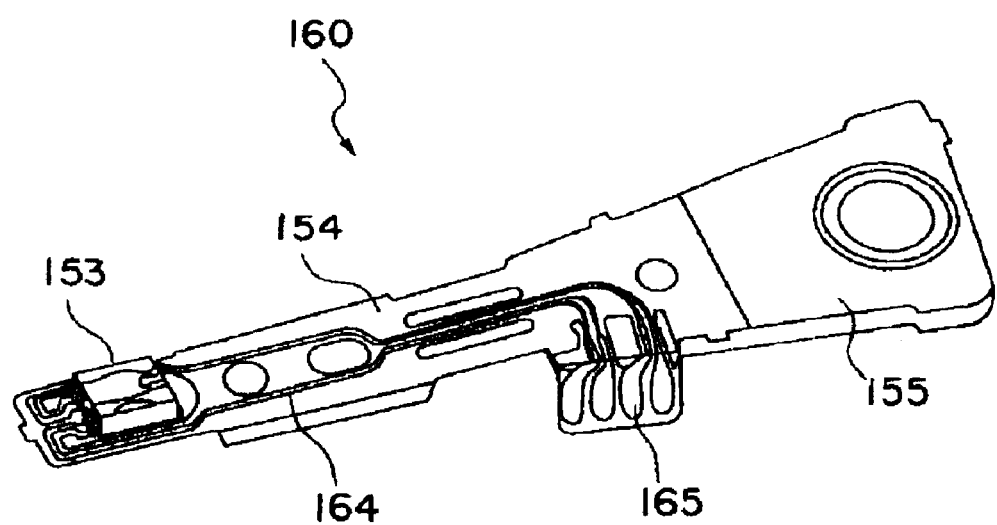
FIG. 17 is an enlarged perspective view of a magnetic head assembly at the distal end of an actuator arm 155, viewed from the disk side.

FIG. 17 is a perspective view of a magnetic head assembly at the distal end from an actuator arm 155 involved, which is viewed from the disk. The magnetic head assembly 160 includes the actuator arm 155 having the bobbin portion supporting the drive coil, for example, and the suspension 154 is connected to one end of the actuator arm 155.

At the distal end of the suspension 154, a head slider 153 carrying the magnetic head as explained with reference to FIGS. 1 through 15 is attached. The suspension 154 has a lead 164 for writing and reading signals, and the lead line 164 is connected to electrodes of the magnetic head incorporated in the head slider 153. Numeral 165 in FIG. 15 denotes an electrode pad of the magnetic head assembly 160.

In this embodiment, one of the magnetic heads already explained in conjunction with the aforementioned embodiments is used as the reading head, information magnetically recorded on the medium disk 200 under a higher recording density than before can be read reliably.

Heretofore, some embodiments of the invention have been explained with reference to specific examples. However, the invention is not limited to these specific examples.

For example, as to a specific structure of the magnetoresistance effect film 4, and the specific size, shape, material, or positional relationship of the magnetic yoke layer 2, electrodes 7 and 8, bias magnetic field applying films 5 and 6, insulating layer 9 can be selected from the known art. The invention encompasses any such changes by persons skilled in the art provided they attain the effects of respective embodiments of the invention.

When the magnetic head according to the present invention is combined with a recording head, a recording-reproducing integrated magnetic head may be realized.

Further, the magnetic reproducing apparatus according to the present invention may be of a fixed type in which specific magnetic recording medium is permanently installed, while it may be of a removable type in which the magnetic recording medium can be replaced easily.

While the present invention has been disclosed in terms of the embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A magnetic head for detecting a signal magnetic field from a recording medium, comprising:

a pair of magnetic yoke layers aligned via a magnetic gap, each said magnetic yoke layer including a yoke projecting portion projected toward said recording medium, and including yoke setback portions set back from said yoke projecting portion;

a magnetoresistance effect film magnetically coupled to said magnetic yoke layers;

a pair of electrodes coupled to said magnetoresistance effect film to supply a current thereto; and first bias magnetic field applying films made of an anti-ferromagnetic material provided at said yoke projecting portions, wherein said first bias magnetic field applying films are stacked on a rear surface of the yoke projecting portions opposite to the recording medium, and said first bias magnetic field applying films are not provided at the yoke setback portions.

2. A magnetic head according to claim 1, further comprising a substrate whose major surface is substantially in parallel with a surface of the recording medium, said pair of magnetic yoke layers and said magnetoresistance effect film being stacked on the major surface of the substrate.

3. A magnetic head according to claim 2, wherein said magnetic yoke projecting portions are formed by skewing the magnetic yoke layers toward the recording medium.

4. A magnetic head according to claim 3, wherein one of said electrodes and said first bias magnetic field applying films are stacked between said yoke projecting portions and said magnetoresistance effect film.

5. A magnetic head according to claim 4, wherein said pair of electrodes supply the current in a direction substantially perpendicular to the major surface.

6. A magnetic head according to claim 1, further comprising second bias magnetic field applying films made of a ferromagnetic material and provided adjacent to side faces of said yoke setback portions.

7. A magnetic head according to claim 1, further comprising a substrate whose major surface is substantially perpendicular to a surface of the recording medium, said pair of magnetic yoke layers and said magnetoresistance effect film being stacked on the major surface of the substrate.

8. A magnetic head according to claim 7, further comprising second bias magnetic field applying films made of a ferromagnetic material and provided adjacent to side faces of said yoke setback portions.

9. A magnetic reproducing apparatus which reads information magnetically recorded in a recording medium, comprising a magnetic head for detecting a signal magnetic field from the recording medium, said magnetic head having:

a pair of magnetic yoke layers aligned via a magnetic gap, each said magnetic yoke layer including a yoke projecting portion projected toward said recording medium, and including yoke setback portions set back from said yoke projecting portion;

a magnetoresistance effect film magnetically coupled to said magnetic yoke layers;

a pair of electrodes coupled to said magnetoresistance effect film to supply a current thereto; and first bias magnetic field applying films made of an anti-ferromagnetic material provided at said yoke projecting portions, wherein said first bias magnetic field applying films are stacked on a rear surface of the yoke projecting portions opposite to the recording medium, and said bias magnetic field applying films are not provided at the yoke setback portions.

* * * * *